United States Patent Office  3,847,833
Patented Nov. 12, 1974

3,847,833
FLEXIBLE ACTIVATED CARBON FIBERS MANUFACTURED FROM SALT IMPREGNATED CELLULOSIC FIBERS
Alan Bailey and Frederick Arthur Pomroy Maggs, Salisbury, England, assignors to The Secretary of State for Defence in Her Britannic Majesty's Government of Great Britain and Northern Ireland, London, England
No Drawing. Continuation-in-part of abandoned applications Ser. No. 1,556, Jan. 8, 1970, and Ser. No. 1,557, Jan. 8, 1970. This application Feb. 4, 1972, Ser. No. 223,782
Claims priority, application Great Britain, Jan. 8, 1969, 1,147/69, 1,148/69, 1,149/69
Int. Cl. C01b 31/08
U.S. Cl. 252—425                17 Claims

ABSTRACT OF THE DISCLOSURE

Strong, flexible highly activated fibrous carbon is produced by incorporating into a fibrous carbohydrate material from a solution a halide of zinc, aluminium, barium, calcium, magnesium or iron, drying the fibrous carbohydrate material, flexing the fibres of the dried material to restore a major proportion of any flexibility lost by contact with the impregnant solution, carbonising the material at about 70 to 300° C. in an inert atmosphere and activating the carbonised material by contact with steam or carbon dioxide at a temperature of from about 600° to about 1000° C.

---

This is a continuation-in-part application of copending applications Ser. Nos. 1,556 and 1,557, both filed Jan. 8, 1970, and both now abandoned.

The invention relates to improvements in the manufacture of carbon, and is particularly concerned with the production of materials consisting wholly or predominantly of carbon in an activated state and in fibrous form, i.e., as a fibre or as a woven or non-woven cloth.

Activated carbon in granular, powder and massive form is well-known and has been used widely for, for example, industrial filtration and decolorisation, air filtration in respirators and air-conditioning systems. The potential advantages of an activated carbon in fibrous form particularly as cloth, are manifold if acceptably high absorbency and strength are obtained. For example, compared with a granular filter bed an industrial filter formed of thicknesses of activated carbon cloth offers relatively little obstruction to the transmission of liquid bearing contaminants to be extracted; replacement or regeneration of a saturated filter is simplified; an activated carbon cloth can be self-supporting; and an activated carbon cloth has no serious tendency to pack down and consolidate under vibration with consequent reduction in filtration efficiency.

Hitherto, various attempts to produce useful acivated fibrous carbon have met with little success because products have failed to combine flexibility, adequate tensile strength and absorbency. The reasons for this are largely that the steps of carbonising (pyrolysing) a carbonaceous material and activating it normally remove a large proportion of the starting material with predictably catastrophic results for thin fibres. Thus, carbonisation of cellulose by conventional means often results in weight losses of around 80% and activation of the carbonised material removes a further 70% in forming the desired porous active surface. Strong fibres have been produced by graphitisation at about 1000° C. resulting in low activities or by impregnation with metal salts, resulting in loss of flexibility giving a product extremely liable to failure due to micro-fracture during subsequent handling.

We have now been able to produce strong, flexible, highly-activated fibrous carbon by modifying various stages of the pretreatment carbonisation and activation routes. These modifications when incorporated in a combined process as hereinafter described can yield an activated fibrous carbon with outstanding properties. Briefly stated, I have found that the incorporation into the fibrous carbohydrate starting material of certain specific impregnants such as salts of calcium, magnesium, zinc, aluminium, cadmium, or mercury, or ammonium salts can, if followed by flexing of the impregnated fibrous carbohydrate material, give high yields, approaching theoretical, of fibrous carbon having good flexibility. The reduced weight loss thus achieved gives a carbonised fibre relatively larger cross-section with consequent improved strength. Additionally, certain impregnants such as salts of barium and strontium increase the carbonised fibre strength irrespective of the effect due to improved cross-sectional area. Furthermore, certain metal cations can be incorporated into the carbonised fibre to increase the rate of activation, for example calcium, barium, cobalt, lead, sodium and potassium and the type of active porosity produced, for example aluminium, zinc and iron, and this can result in an acceptably active fibre from which only about 30% by weight of the unactivated carbonised fibre starting material is lost, again achieving overall a stronger active fibrous material. By combining some or all of these treatments it has been possible to produce carbon cloth in which the fibres have a breaking strength in excess of 40,000 and in some cases as high as 120,000 pounds/square inch, activities of at least 50%, and often in excess of 120% by weight sorbtion of carbon tetrachloride and a BET surface area of at least 500 and generally about 700–1200° m.$^2$/gram. The carbon cloth may typically have envelope density, that is the density of the individual filaments making up the cloth of 1 g./ml. in which about 50% of the filament volume constitutes usefully active pores and a bulk density when compressed to 40 grams/cm.$^2$ of about 0.2–0.3 g./ml.

According to a further aspect of the invention, therefore, a process for the production of a strong, flexible, highly-activated fibrous carbon comprises incorporating into a fibrous carbohydrate material from a solution at least one impregnant selected from the group consisting of chlorides and bromides of zinc, aluminium, barium, calcium, magnesium and iron, drying the fibrous carbohydrate material and flexing the fibres of the material sufficiently to restore the major proportion of any flexibility lost by contact with the impregnant solution, carbonising the material by heating to carbonising temperature in an inert atmosphere, and activating the carbonised material by contact at an activation temperature with an activating gas selected from the group consisting of steam and carbon dioxide until the activate has a carbon tetrachloride sorbency of at least 50% by weight.

Throughout the specification and claims the term "flexible" as applied to an activated fibrous carbon is used to denote a fibre or fabric which is sufficiently deformable to fold back upon itself without fracture around a radius of curvature of 0.5 millimetre; and the term highly-activated is used to denote an active fibrous carbon which can sorb at least 50% of its own weight of carbon tetrachloride. The term "strong" as applied to fibrous carbon is not susceptible of precise definition because of the wide variations in strength attainable with fibrous active carbons produced from different fibrous carbohydrate starting materials. Thus, for example, an active fibrous carbon obtained from a naturally occurring fibrous cellulose such as cotton is inherently much weaker than an active fibrous carbon obtained from a regenerated cellulose fibre such as viscose rayon. The term "strong" is therefore used generally to indicate fibre strengths in the higher regions of the attainable strength range, but for viscose rayon- and cuprammonium rayon-derived fibrous carbons can be more closely defined as a breaking strength of at least 30,000 pounds per square inch.

The presence of the impregnant in the carbonisation process may be ensured by incorporating the impregnant in the material to be carbonised at any stage prior to complete carbonisation, but it is preferable generally to incorporate impregnants before any carbonisation of the starting material has taken place. Incorporation of impregnant is conveniently achieved by immersing the starting material in a solution (which terms includes a dispersion) of the impregnant and thereafter drying the material to leave the impregnant therein. Alternatively the impregnant may be incorporated in a precursor of the starting material. For example an impregnant may be admixed with a solution of viscose before the latter is extruded to form filaments of rayon in a precipitating bath.

The preferred method of incorporation is by soaking the fibrous carbohydrate material in a solution of the impregnant, but considerable care should be taken to optimise the conditions under which contact with the impregnant occurs. Thus it is found that a very brief or a fairly lengthy contact time—that is the time for which the carbohydrate material is wet with the impregnant solution—will generally result in good yields of strong carbonised fibrous material, but intermediate contact times can give considerably weaker carbonised material. A similar strength variation may be observed to accompany variations in drying temperature, intermediate temperatures of around 50° C. for example usually yielding much weaker carbonised material than temperatures around room temperature or about 100° C. This variable behaviour varies further between different fibrous carbohydrate starting materials and it is generally advisable to carry out a few preliminary tests to ascertain the optimum treatment for a particular starting material.

Where the impregnant is incorporated from solution, the solution should normally have a concentration of between 1 and 30% by weight of the impregnant and preferably 2–10% by weight. As a rough guide in this preferred range, the amount of impregnant actually incorporated in the cloth approximates to the concentration in the solution i.e. a 5% solution of zinc chloride incorporated 7 to 8% by weight of impregnant into a typical cellulose rayon fibre. The temperature and concentration of the impregnant solution are both kept as low as consistent with a useful level of incorporation for a reasonable contact time. For some coated fibrous carbohydrates, however, such as viscose rayon cloths coated with urea-formaldehyde resin to give crease-resistance, it may be necessary to use concentrations at the upper end of the range and temperatures of up to about 100° C. to achieve incorporation of impregnant.

When a fibrous carbohydrate is dried after contact with the impregnant solution it is generally found that adjacent fibres have weakly adhered to one another possibly due to the formation of a "gel" type of structure on the fibre surface during contact with the impregnant solution. The resulting stiffness in the treated carbohydate should be largely removed by flexing the fibres of the dried material if good flexibility is to be obtained in the activated fibrous carbon finally produced. Flexing may be adequately achieved by manual working of the dried material to restore suppleness or by a variety of mechanical treatments of the dried material in which the fibres are flexed. A useful technique is to draw the fibrous material around a smooth surfaced edge so that its direction changes fairly sharply and an appropriate restoration of flexibility is achieved. Alternatively the dried material may be drawn between opposed brushes or over calendering rollers.

Carbonisation of fibrous carbohydrates having impregnant incorporated therein as hereinbefore described can offer high carbonisation efficiencies; reduced thermal decomposition temperatures for the fibrous carbohydrate starting material resulting in operating economies; enhanced strength in the resulting char; and a fibrous carbon which has good strength and flexibility. At least one of these advantages is obtainable from any of the impregnant defined and a given impregnant may be selected to optimise a desired advantageous effect. Alternatively, in accordance with a preferred feature of the invention, a combination of impregnants may be used to maximise the potential advantages of the improved carbonisation process.

As a general guide, the yield of carbonised fibre (char) will be increased and the thermal decomposition temperature decreased by the impregnants aluminium chloride, zinc chloride and calcium chloride. Particularly in the case of fibrous carbohydrates such as cellulose, we have discovered that the thermal decomposition mechanism of the starting material is modified by the presence of the impregnants to such an extent that the dehydration reaction is favoured to give water as the primary volatile decomposition product together with a high yield of char which in favourable circumstances may approach the theoretical yield.

Enhanced breaking strength, combined with good flexibility is normally obtained from the use of the impregnants, barium, calcium, magnesium and zinc dichlorides and aluminium trichlorides and tribromides.

The following table illustrates the percentage yield of char achieved in comparison with the theoretical value for four typical viscose rayon cloths.

| Impregnant | None | $ZnCl_2$ | $AlBr_3$ | $CaCl_2$ |
|---|---|---|---|---|
| Cloth: | | | | |
| 1 | 65.9 | 78.6 | 84.1 | 94.7 |
| 2 | 55.9 | | | |
| 3 | 40.9 | | | |
| 4 | 56.8 | 81.8 | | 93.2 |

The impregnants were incorporated by immersing the cloth samples in a 10% by weight aqueous solution of the impregnants (containing chloride ions to prevent hydrolysis) and then rapidly drying the cloth.

Preferred fibrous carbohydrate materials are yarns and cloths of regenerated cellulose such as viscose rayon and cuprammonium rayon. The diameter of the cellulose fibres used is not critical to the success of the process, but it is found that the smaller the fibre diameter the more flexible in general will be the carbonised product. Typically, cellulosic fibre diameters of 5–20 microns represent a good compromise between tensile strength and flexibility in the resulting carbonised fibre, and if the cellulosic fibre is in the form of a woven or knitted cloth the carbon cloth resulting is normally strong and flexible. The mechanism of this tensile strength enhancement is as yet unknown, but it is believed that the tensile strength increase is partly due to the incorporation of metal atoms into the structure of the char.

Carbonisation of fibrous carbohydrates incorporating impregnant is carried out by heating in an inert atmosphere i.e. in vacuum or an atmosphere consisting substantially of any unreactive or inert gas or mixture of any of these gases such as nitrogen, carbon dioxide, helium or argon.

Various publications have indicated that the properties of the fibrous carbon produced by carbonising cellulosic material is influenced by the rate of the heating process. Slow heating rates over wide temperature ranges have generally been advocated although British Patent Specification No. 1,001,606 does indicate that slow heating rates between about 280° and 320° C. are beneficial.

We have found that when impregnants are used in carbonising processes in accordance with the present invention, there is, within the broad temperature range of 70°–300° C, a critical temperature range of between 40° and 80° C. depending upon the impregnant used, within which the temperature should be maintained for at least 15 and preferably 20 minutes for a 40° C. range, and up to at least 30 minutes for a 80° C. range, in order to produce fibrous carbon having relatively high tensile strength without loss of other valuable properties. It has been found particularly advantageous for the material to be held at a constant temperature within the critical range for a period between 15 minutes and 1 hour, particularly as a pause period within a steadily rising temperature programme.

The critical temperature range is around the temperatures at which the material starts to decompose and loses weight most rapidly during the carbonising process.

The temperatures at which the bulk of decomposition takes place for a typical rayon cloth impregnated with various impregnants are as follows:

| Impregnant: | Approximate decomposition temperature (° C.) |
|---|---|
| None | 280 |
| $AlBr_3$ | 80 |
| $AlCl_3$ | 100–180 |
| $ZnCl_2$ | 200–270 |

The improvement in strength obtained by carbonising a rayon cloth ["Ravello," in the form of an undyed and unfinished viscose rayon textile cloth supplied by William Ewart & Sons, impregnated with Lewis acids by immersion for half a minute in an aqueous solution of zinc chloride (5% by weight) and ammonium chloride (2½% by weight) followed by drying at 110° C. for 20 minutes] with a pause in the critical temperature range is illustrated by the following table.

| Carbonisation Conditions (Heating at 6° C./Minute to 800° C.) | Breaking Strength (g.) of 2 cm. wide sample of cloth |
|---|---|
| No pause | 2340 |
| 30 min. pause at 250° C. | 3990 |
| 30 minu pause at 300° C. | 3830 |

According to a further aspect of the present invention, therefore, a process for the production of a strong, flexible, highly-activated fibrous carbon comprises incorporating in a fibrous carbohydrate material at least one impregnant selected from the group consisting of chlorides and bromides of zinc, aluminum, barium, calcium, magnesium and iron, carbonising the fibrous carbohydrate material by heating in an inert atmosphere up to the critical decomposition temperature range (as hereinbefore defined) and maintaining the temperature within the said critical temperature range for at least fifteen minutes for a 40° C. critical temperature range and up to at least 30 minutes for an 80° C. critical temperature range, and activating the carbonised material by contact at an activation temperature with an activating gas until the activate has a carbon tetrachloride sorbency of at least 50% by weight.

The rate of heating as the critical temperature range is approached is preferably slow and for best results the rate should not exceed about 10° C. rise per minute. The initial rise from ambient temperature may, however, be faster.

Activation of the carbonised fibre (char) is achieved by heating the char at an activation temperature in the presence of a stream of activating gas until the desired porosity (activity) is achieved. Activation temperatures are between 600° C. and 1000° C. and generally between 700° C. and 900° C. and the activating gas is preferably steam or carbon dioxide.

According to a further important aspect of the present invention when certain metal cations have been incorporated in the carbonised material to be activated, an activation process of improved efficiency results manifesting itself as a significant reduction in the energy required to activate the carbonised material. This allows activation to occur at a useful rate at the lower end of the range referred to herein i.e. about 600°–700° C., while causing a useful increase in rate of activation at the upper end of the activation temperature range, i.e. about 800°–900° C. Cations which provide these desirable effects on the activation processes are cations of lead, calcium, cobalt, barium, sodium and potassium.

The cations are conveniently introduced as salts such as the halides, particularly the chlorides. Lead cations introduced in the form of lead acetate or lead nitrate are also effective.

For rapid sorption of gases it is found that an activated fibrous carbon requires to have a considerable number of relatively large (on a molecular scale) pores rather than numerous small pores. This information is not given by the value of specific surface area for the activated material but may be obtained by using the activated material as, in effect, a molecular sieve and measuring the relative heats of wetting respectively of a liquid composed of relatively small molecules such as methanol or a liquid having relatively large molecules such as a liquid silicone fluid. In general, the longer a char is in contact with the activating gas, steam or carbon dioxide, the greater is the loss in weight of the char by the pore-forming activation reaction. At the same time, the average pore size increases with increasing weight loss. Thus for the most active material a high proportion of the original char weight should be lost, but excessively high weight losses can result in large reductions in the breaking strength of the treated fibrous char and considerably reduce the yield of activated product. We have found that the optimum compromise between breaking strength and activity for a carbon cloth is normally obtained at between about 40–70% weight loss during activation and preferably about 60% by weight. In accordance with a further feature of the invention, however, where the char to be activated has been impregnated with metal cations of zinc, aluminum, or iron equally good properties may be obtained for weight losses of only 20–40% and preferably about 30%. This increased activity is apparently due to a modification of the pore structure of the char and is of much practical importance since not only may the duration of the activation stage be reduced, but the volume activity of the activated cloth is enhanced.

The proportion of impregnated metal cations which can be incorporated usefully as a salt into material to be activated is normally between 0.1 and 10% by weight and more commonly 1–5%. The mose convenient method of incorporation comprises contacting the carbonised fibrous starting material with a solution of the metal salt or, alternatively, so contacting a precursor of the carbonised fibrous starting material eg a cellulosic fibre before carbonisation.

The effects of various impregnants have been described herein with reference to their use at various stages of processes for carbonisation and activation in accordance with the present invention. Impregnants which offer the best combination of benefits when used as the sole impregnant in a process in accordance with the invention are zinc, aluminium and iron. No single impregnant has so far been found to achieve all the desirable effects described, but it will be apparent to those skilled in this art that two or more impregnants may be combined to produce a combination of desirable effects. For example the addition of as little as 0.5% of $CaCl_2$ to a 5% $ZnCl_2$ impregnating bath achieves a very significant lowering in the activation temperature of the impregnated material. In addition it is often desirable to add salt having the same anion to the impregnant solution to prevent hydrolysis by application of the common ion effect. For example ammonium chloride may be added to a zinc chloride solution.

Processes in accordance with the present invention will now be illustrated by the following comparative tables in which:

Table I shows qualitatively the effect of various metal cation salts on the rate of activation by steam on a carbonised rayon cloth (A Moygashel fabric having 30 warp and 30 weft fibres per inch, each fibre of 200 (200) Denier ) and Table II illustrates the effect of various impregnants on the yield and heats of wetting of an activated carbon cloth derived from the same Moygashel fabric.

TABLE I

| Impregnant: | Effect on rate of Activation |
|---|---|
| None | Normal |
| $AlCl_3$ | + |
| $FeCl_3$ | + |
| $ZnCl_2$ | + |
| $BaCl_2$ | ++ |
| $CaCl_2$ | +++ |
| $CoCl_3$ | +++ |
| $PbNO_3$ | +++ |

The activation was carried out at 800° C. in a stream of steam. The symbol + denotes an activation rate increase of about 10% and each additional symbol indicates a further rate increase of about this magnitude.

TABLE II

| | Percent yield at which heat of wetting* is 10 cal./g. | Heat of wetting at 70% yield (calories/g.) | |
|---|---|---|---|
| | | Benzene | Silicone* |
| Impregnant: | | | |
| None | 58 | 16 | 2.5 |
| $CoCl_2$ | 56 | | |
| $BaCl_2$ | 57 | | |
| $PbNO_3$ | 59 | | |
| $CaCl_2$ | 68 | | 7.5 |
| $FeCl_3$ | 70 | | 10 |
| $ZnCl_2$ | 73 | 28 | 12 |
| $AlCl_3$ | 73 | | 15 |

A typical Example of a process for the production of a strong, flexible, highly-activated carbon fibre will now be described.

A viscose rayon cloth [a "loomstate," i.e., undyed and non-finished, cloth with a plain (linen) weave supplied as "Ravello" by William Ewart and Sons] containing considerably less than 2% of size and/or finishing material was passed into an aqueous impregnant bath containing by weight 6% of zinc chloride, 4% calcium chloride and 2% ammonium chloride. The soaked cloth was removed from the impregnant bath, passed between rolls to remove surplus impregnant solution and dried by passage through an air blown oven at about 100–140° C. The contact time of the cloth with the impregnant solution—that is the time in the bath plus the time the cloth remained in damp condition before drying—was arranged to be at least 20 minutes. After drying, the cloth was flexed by passing it over a smooth surfaced edge to achieve a sharp change in direction of cloth motion and thereby restore the majority of any flexibility lost by the contact with the impregnant.

The treated cloth was then passed into an oven and heated at a rate of 7° C. per minute up to 230° C.±10° C. and maintained in this critical range for 15–25 minutes, all heating taking place in nitrogen. The material was then passed through a furnace in which the temperature was raised at a rate not exceeding 25° C./minute to 780° C. ±20° C. This maximum temperature was maintained for 15±10 minutes and the atmosphere during the heating in the furnace was a stream of carbon dioxide activating gas. About 20% by weight of the cloth was removed during activation, but little decrease in strength resulted.

The heating programme was carried out in the vertical furnace fully described and claimed in our co-pending patent application No. 1,561.

The fibrous active carbon cloth obtained was flexible, had a calculated tensile strength of the order of 70,000 pounds per square inch and a very high activity giving a carbon tetrachloride sorbency in excess of 100% by weight.

We claim:

1. A process for the production of a strong, flexible, highly activated fibrous carbon having a breaking strength of at least 30,000 p.s.i., a carbon tetrachloride sorbency of at least 50% by weight and sufficiently flexible to fold back upon itself without fracture around a radius of curvature of 0.5 mm., from a fibrous cellulosic material, said process comprising:

contacting the said fibrous cellulosic material with an aqueous solution containing between 1–30% by weight of at least one impregnant selected from the group consisting of halides of zinc, aluminum, barium, calcium, magnesium and iron to impregnate the fibrous carbohydrate material with between 0.1 and 10% by weight of the said impregnant cations, drying the impregnated fibrous cellulosic material at a temperature in the range of 100° to 140° C., flexing the fibres of the dried material to restore a major proportion of any flexibility lost during the impregnation and drying of the fibrous cellulosic material, carbonizing the material by heating in an inert atmosphere to a carbonizing temperature through the critical decomposition temperature range which extends for between 40° C. and 80° C. within the temperature limits 70° C. and 300° C. and maintaining the temperature within the said critical temperature range for a time which is at least fifteen minutes for a critical temperature range of 40° C. increasing progressively to at least thirty minutes for a critical temperature range of 80° C., and activating the carbonized material by contact at an activation temperature between 600° C. and 1000° C. with an activating gas selected from the group consisting of steam and carbon dioxide until the activate has a carbon tetrachloride sorbency of at least 50% by weight.

2. A process according to claim 1 wherein the impregnant is selected from the group consisting of chlorides and bromides of zinc, aluminum, barium, calcium, magnesium and iron.

3. A process according to claim 2 wherein the impregnant is zinc chloride.

4. A process according to claim 2 wherein the impregnant is aluminum chloride.

5. A process according to claim 2 wherein the impregnant is calcium chloride.

6. A process according to claim 1 and in which the rate of heating as the critical decomposition temperature range is approached does not exceed 10° C. rise per minute.

7. A process according to claim 1 wherein activation is carried out at between 700° C. and 900° C.

8. A process according to claim 1 in which the efficiency of activation is improved by additionally impregnating the carbonised material prior to treatment with activating gas with a solution containing a salt to provide cations of lead, barium, cobalt, calcium, sodium or potassium.

9. A process according to claim 8 and in which the cations are provided in the form of halide salt.

10. A process according to claim 9 wherein the halide salt is a chloride.

11. A process according to claim 1 and in which the carbonised material is subjected to the activating gas for a period sufficient to achieve a weight loss of 40–70%.

12. A process according to claim 1 and in which the carbonised material is subjected to the activating gas for a period sufficient to achieve a weight loss of 20–40%, when the impregnant is selected from the group consisting of halides of zinc, aluminum and iron.

13. A process according to claim 1 wherein the fibrous cellulosic material is a fibrous cellulose.

14. A process according to claim 13 wherein the fibrous cellulose is a regenerated cellulose.

15. A process according to claim 14 wherein the regenerated cellulose is viscose rayon.

16. A process according to claim 14 wherein the regenerated cellulose is cuprammonium rayon.

17. A process according to claim 1 and in which a common anion is present in the aqueous solution to prevent excessive hydrolysis of the impregnant.

References Cited

UNITED STATES PATENTS

| | | | |
|---|---|---|---|
| 3,053,775 | 9/1962 | Abbott | 252—421 |
| 3,461,082 | 8/1969 | Otani et al. | 252—421 |
| 3,479,151 | 11/1969 | Gutzeit | 423—447 |
| 2,529,934 | 9/1970 | Shindo et al. | 423—447 |
| 3,441,378 | 4/1969 | Didchenko | 423—447 |
| 3,018,288 | 1/1962 | Tokime et al. | 252—421 |
| 1,535,798 | 4/1925 | Wickenden | 252—425 |
| 3,329,626 | 7/1967 | Teter et al. | 252—425 |
| 1,891,407 | 12/1932 | Godel | 252—421 |
| 3,639,266 | 2/1972 | Battista | 252—445 |
| 2,342,862 | 2/1944 | Hemminger | 252—421 |

DANIEL E. WYMAN, Primary Examiner

P. E. KONOPKA, Assistant Examiner

U.S. Cl. X.R.

252—422, 445, 447; 423—447